(12) United States Patent
Wurm et al.

(10) Patent No.: US 8,400,925 B2
(45) Date of Patent: Mar. 19, 2013

(54) DATA RATE CONTROL MECHANISM

(75) Inventors: Karlheinz Wurm, Tallinn (EE);
Christoffer Rodbro, Stockholm (SE)

(73) Assignee: Skype, Dublin (IE)

(*) Notice: Subject to any disclaimer, the term of this patent is extended or adjusted under 35 U.S.C. 154(b) by 495 days.

(21) Appl. No.: 12/636,253

(22) Filed: Dec. 11, 2009

(65) Prior Publication Data
US 2011/0128868 A1    Jun. 2, 2011

(30) Foreign Application Priority Data

Nov. 30, 2009  (GB) .................................. 0920910.7

(51) Int. Cl.
*H04J 3/14* (2006.01)

(52) U.S. Cl. ........ 370/236; 370/248; 370/252; 370/255; 709/224; 709/233

(58) Field of Classification Search .......... 370/229–235, 370/236, 236.1, 236.2, 241.1, 248, 252–255; 709/223–226, 231–235, 249
See application file for complete search history.

(56) References Cited

U.S. PATENT DOCUMENTS

| | | | | |
|---|---|---|---|---|
| 5,408,465 | A * | 4/1995 | Gusella et al. ................ | 370/231 |
| 6,069,872 | A * | 5/2000 | Bonomi et al. ................ | 370/236 |
| 6,452,903 | B1 * | 9/2002 | Peck et al. .................... | 370/235 |
| 6,937,574 | B1 * | 8/2005 | Delaney et al. ............... | 370/254 |
| 7,020,791 | B1 | 3/2006 | Aweya et al. | |
| 7,559,078 | B2 | 7/2009 | Zhang et al. | |
| 7,778,179 | B2 | 8/2010 | Ekelin et al. | |
| 8,259,570 | B2 | 9/2012 | Rodbro et al. | |
| 2002/0044528 | A1 | 4/2002 | Pogrebinsky et al. | |
| 2002/0136162 | A1 * | 9/2002 | Yoshimura et al. ........... | 370/229 |
| 2004/0076118 | A1 * | 4/2004 | Ho et al. ....................... | 370/235 |
| 2004/0165528 | A1 * | 8/2004 | Li et al. ........................ | 370/230 |
| 2004/0184449 | A1 | 9/2004 | Sreejith et al. | |

(Continued)

FOREIGN PATENT DOCUMENTS

| | | |
|---|---|---|
| GB | 2466208 | 6/2010 |
| KR | 20060012418 | 2/2006 |

(Continued)

OTHER PUBLICATIONS

Park, K-J., et al., "Stochastic Analysis of Packet-Pair Probing for Network Bandwidth Estimation," Computer Networks, 50(12):1901-1915 (2006).

(Continued)

*Primary Examiner* — Jeffrey M Rutkowski
(74) *Attorney, Agent, or Firm* — Wolfe-SBMC (57) ABSTRACT

A method and product for controlling a rate of transmission from a first, transmitting node to a second, recipient node. The method comprises: transmitting a stream from the first node to the second node over a first network route; transmitting further data from the first node to a third node over a second network route substantially overlapping with the first network route; receiving feedback at the first node from the third node regarding transmission of the further data to the third node over the second network route; and based on the feedback from the third node, controlling a rate of transmission of the stream to the second node over the first network route. The third node may not be a recipient of said stream. The rate of transmission may be controlled without feedback from the second node. The further data may be formed of dummy data.

57 Claims, 8 Drawing Sheets

U.S. PATENT DOCUMENTS

| | | | |
|---|---|---|---|
| 2005/0159894 A1 | 7/2005 | Intriligator et al. | |
| 2006/0067215 A1* | 3/2006 | Elliott et al. | 370/230 |
| 2007/0081561 A1 | 4/2007 | Heninger et al. | |
| 2007/0115814 A1 | 5/2007 | Gerla et al. | |
| 2007/0115849 A1 | 5/2007 | Ekelin et al. | |
| 2008/0253286 A1 | 10/2008 | Shriram et al. | |
| 2009/0049175 A1* | 2/2009 | Finn | 709/226 |
| 2009/0164657 A1 | 6/2009 | Li et al. | |
| 2010/0150171 A1 | 6/2010 | Rodbro et al. | |
| 2010/0208732 A1 | 8/2010 | Rodbro et al. | |
| 2010/0220629 A1 | 9/2010 | Chang et al. | |

FOREIGN PATENT DOCUMENTS

| | | |
|---|---|---|
| WO | WO 2005/009019 A2 | 1/2005 |
| WO | WO-2007129134 | 11/2007 |
| WO | WO-2010066854 | 6/2010 |
| WO | WO-2010066855 | 6/2010 |
| WO | WO-2010066903 | 6/2010 |

OTHER PUBLICATIONS

Notification of Transmittal of the International Search Report and the Written Opinion of the International Searching Authority issued in International Application No. PCT/EP2009/066869, including International Search Report dated Apr. 7, 2010, and Written Opinion of the International Searching Authority dated Apr. 7, 2010. (18 pages).

International Search Report and Written Opinion, International Application No. PCT/EP2009/067002, (Mar. 23, 2010), 20 pages.

International Search Report and Written Opinion, International Application No. PCT/EP2009/066870, (Mar. 26, 2010), 19 pages.

Non Final Office Action, U.S. Appl. No. 12/455,908, (Oct. 27, 2011), 5 pages.

Non Final Office Action, U.S. Appl. No. 12/455,908, (Feb. 17, 2011), 18 pages.

Non-Final Office Action, U.S. Appl. No. 12/636,156, (Oct. 31, 2011), 10 pages.

Non-Final Office Action, U.S. Appl. No. 12/636,156, (Mar. 6, 2012), 10 pages.

Notice of Allowance, U.S. Appl. No. 12/455,908, (Feb. 16, 2012), 7 pages.

Search Report, Application No. GB0822620.1, (Mar. 2, 2009), 1 page.

Search Report, Application No. GB0920910.7, (Apr. 14, 2010), 1 page.

Dovrolis, Constantinos et al., "Packet-Dispersion Techniques and a Capacity-Estimation Methodology", *IEEE/ACM Transactions on Networking*, (2004), pp. 963-977.

Jain, Manish et al., "End-to-End Available Bandwidth: Measurement Methodology, Dynamics, and Relation with TCP Thoroughput", *Computer Communication Review, ACM*, New York, NY 32(4):295-308 (2002), 14 pages.

Notice of Allowance, U.S. Appl. No. 12/636,156, (Jun. 12, 2012), 4 pages.

\* cited by examiner

DATA RATE CONTROL MECHANISM

RELATED APPLICATION

This application claims priority under 35 U.S.C. §119 or 365 to Great Britain Application No. 0920910.7, filed Nov. 30, 2009. The entire teachings of the above application are incorporated herein by reference.

FIELD OF THE INVENTION

The present invention relates to a data rate control mechanism for use in an electronic communication system implemented over a network.

BACKGROUND

Some communication systems allow the user of a device, such as a personal computer, to communicate across a packet-based computer network such as the Internet. Such communication systems include voice over Internet protocol ("VoIP") systems. These systems are beneficial to the user as they are often of significantly lower cost than conventional fixed line or mobile networks. This may particularly be the case for long-distance communication. To use a VoIP system, the user installs and executes client software on their device. The client software sets up the VoIP connections as well as providing other functions such as registration and authentication. In addition to voice communication, the client may also set up connections for other communication media such as video calling, instant messaging ("IM"), SMS messaging, file transfer and voicemail.

One type of communication system for packet-based communication uses a peer-to-peer ("P2P") topology. To enable access to a peer-to-peer system, a user executes P2P client software provided by a P2P software provider on their computer, and register with the P2P system. When the user registers with the P2P system, the client software is provided with a digital certificate from a server. Once the client software has been provided with the certificate, then calls or other communication connections can subsequently be set up and routed between users of the P2P system without the further use of a server in the set-up. Instead, the client looks up the required IP addresses from information distributed amongst the P2P client software on other end users' computers within the P2P system. That is, the address look-up list is distributed amongst the peers themselves. Once the IP address of a callee's terminal has thus been determined, the caller's P2P client software then exchanges certificates with the callee's P2P client software. The exchange of the digital certificates (or user identity certificates, "UIC") between users provides proof of the users' identities and that they are suitably authorised and authenticated in the P2P system. Therefore, the presentation of digital certificates provides trust in the identity of the users.

It is therefore a characteristic of peer-to-peer communication that, once registered, the users can set up their own communication routes through the P2P system in an at least partially decentralized manner based on distributed address look-up and/or the exchange of one or more digital certificates, without using a server for those purposes. Further details of an example P2P system are disclosed in WO 2005/009019.

VoIP or other packet-based communications can also be implemented using non-P2P systems that do use centralized call set-up and/or authentication, e.g. via server.

When transmitting data between two nodes over a network, the channel bandwidth may vary depending on the network route, network conditions (e.g. amount of other traffic), and the capabilities of the transmitting and recipient nodes themselves (e.g. uplink bandwidth of the transmitting node, downlink bandwidth of the recipient node, or processing resources of either node). To accommodate for this, a number of different mechanisms have been proposed for rate control in packet switched systems in order for the transmitting node to adapt its rate of data transmission as appropriate to the channel bandwidth. However, conventional mechanisms require that the recipient node "cooperates", i.e. provides feedback about the transmission statistics in a pre-specified format.

Figure 4A:
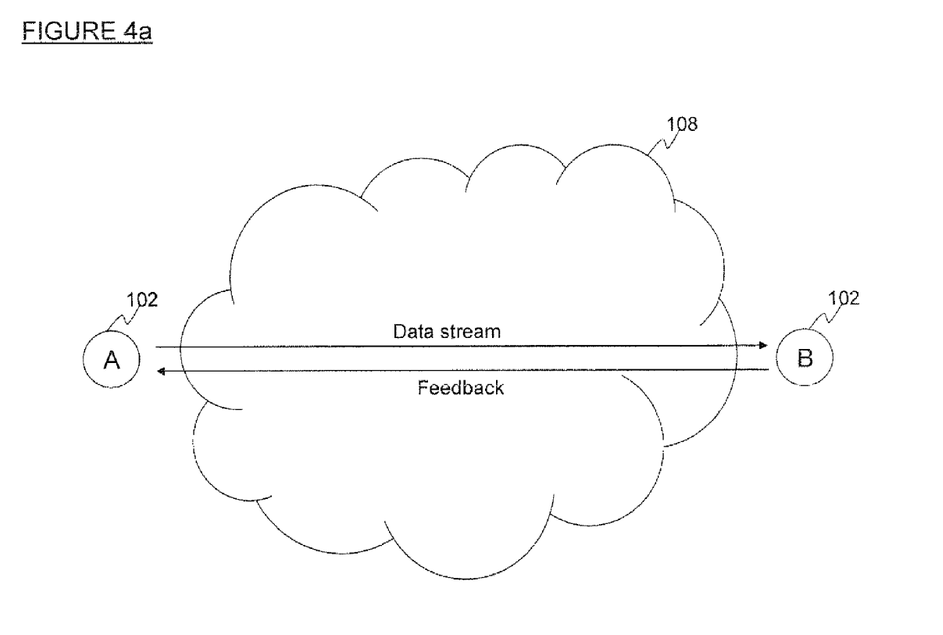
FIG. 4a is a schematic representation of a rate control mechanism requiring cooperation of the recipient node.

Referring to FIG. 4a, suppose for example that a transmitting node A is to send a packet stream to another, recipient node B via a network 108, but the channel bandwidth from A to B is unknown. Conventionally, this problem may be circumvented by implementing a rate control mechanism at A and B. Such a mechanism typically has one of two forms: transmitter based or receiver based.

According to a transmitter based mechanism, the transmitting node A sends packets to the recipient node B, and B measures certain statistics (e.g. loss, queuing delay, etc.) on the received packet stream. The recipient B feeds the statistics back to the transmitting node A, and A then determines a rate for subsequent transmission to B based on the fed back statistics.

According to a receiver based mechanism, B monitors the received packet stream and directly feeds back a suggested rate for A to use.

However, as mentioned, both of these mechanisms require that the recipient node cooperates by providing feedback to the transmitter according to some predetermined format or protocol. This is problematic if the recipient node B has no rate control mechanism compatible with that of the transmitting node A—either because the recipient node B does not have a mechanism to provide such feedback at all, or because the mechanisms of the transmitter A and recipient B use different formats or protocols. It would therefore be advantageous to find an alternative rate control mechanism.

SUMMARY

According to one aspect of the present invention, there is provided a method of controlling a rate of transmission from a first, transmitting node to a second, recipient node; the method comprising: transmitting a stream from the first node to the second node over a first network route; transmitting further data from the first node to a third node over a second network route substantially overlapping with the first network route; receiving feedback at the first node from the third node regarding transmission of the further data to the third node over the second network route; and based on said feedback from the third node, controlling a rate of transmission of the stream to the second node over the first network route.

Thus if the second, recipient node does not or cannot provide sufficient feedback when transmitting a data stream from the first node to the second node, then the present invention can advantageously make use of third node to provide feedback for stream rate control.

By making use of a third node, then the reliance on the cooperation of the second, receiving node can be reduced or circumvented to a substantial extent. This can be of importance for example if the first and second nodes are and have different rate control mechanisms implemented; or if the second, receiving node does not have a rate control mechanism available at all. Alternatively, the second node may have a functioning rate control feedback, but one which may benefit from supplementary feedback from the third node in addition to the feedback from the second node.

In embodiments, the third node may not be a recipient of said stream.

The rate of transmission may be controlled without feedback from the second node.

Said further data may be formed of dummy data.

The method may further comprise detecting a measure indicative of whether the first network route substantially overlaps with the second network route, and if not switching to an alternative mode of operation in which said rate of transmission is controlled based on feedback from the second node without feedback from the third node.

Said measure may comprise at least one of: a round trip time and a measure of data loss over the first network route.

The second network route may substantially overlap with the first network route in that the routes may share at least an initial uplink hop.

The second network route may substantially overlap with the first network route in that the routes may share at least one hop between service provider routers.

The second network route may substantially overlap with the first network route in that the routes may share a plurality of hops between service provider routers.

The second network route may substantially overlap with the first network route in that the routes may share at least one hop beyond a portion of the route from the transmitting node to a first service provider router.

The second network route may substantially overlap with the first network route in that the routes may share at least one international hop.

The second network route may substantially overlap with the first network route in that the routes may share at least hop between wide area networks.

The first and second network routes may each comprise a plurality of routers, and the second network route may substantially overlap with the first network route in that the routes may share at least the slowest router of each route.

The second network route may substantially overlap with the first network route in that the second node and third node may share at least one of: the same LAN, the same WLAN, the same local ISP, the same mobile data quality-of service profile, or the same cell of a cellular communication system.

The first node may be an end-user node. The second node may be an end-user node. The third node may be an end-user node.

Alternatively, the third node may be a server, and/or the first node may be a server.

The second node may have no rate control mechanism compatible with that of the first node.

The method may further comprise determining whether the second node has a rate control mechanism compatible with the first node, and selecting to use said third node for feedback on condition of said detection.

Said determination may be performed by transmitting data from the first node to the second node and detecting whether a rate control feedback message is returned from the second node to the first node within a timeout period.

Said determination may be performed by transmitting a query message from the first node to the second node, and receiving back a response message from the second node to the first node indicating whether the second node has a compatible rate control mechanism.

The first node and third node may both support a rate control mechanism that is preferred over any rate control mechanism supported by both the first node and the second node.

The first node may transmit the further data to the third node periodically in between transmitting data of said stream to the second node.

The method of rate control may be transmitter-based such that said feedback from the third node may comprise at least one or more statistics of the route between the first and third node, and the first node may determine the rate of transmission to the second node based on said one or more statistics.

Said one or more statistics may comprise at least one of a loss rate and a queuing delay.

The method of rate control may be receiver based, such that said feedback from the third node may comprise an indication of the specified rate or bandwidth of the route between the first and third node, and said first node may use the specified rate or bandwidth as the rate of transmission to the second node.

Said further data transmitted to the third node may comprises an indication of an amount of data sent in said stream to the second node, and said feedback from the third node to the first node may be based on the indication of said amount.

According to a further aspect of the present invention, there is provided a computer program product for controlling a rate of transmission from a first, transmitting node to a second, recipient node; the program comprising code embodied on a computer-readable medium and configured so as when executed on the first node to: transmit a stream from the first node to the second node over a first network route; transmit further data from the first node to a third node over a second network route substantially overlapping with the first network route; receive feedback at the first node from the third node regarding transmission of the further data to the third node over the second network route; and based on said feedback from the third node, control a rate of transmission of the stream to the second node over the first network route.

In embodiments, the program product may be further configured in accordance with any of the above method features.

According to another aspect of the present invention, there is provided a first node for controlling a rate of transmission from the first node to a second, recipient node; the first node comprising: a transmitter arranged to transmit a stream from the first node to the second node over a first network route, wherein the transmitter is configured to transmit further data from the first node to a third node over a second network route substantially overlapping with the first network route; a receiver arranged to receive feedback at the first node from the third node regarding transmission of the further data to the third node over the second network route; and processing apparatus configured to control, based on said feedback from the third node, a rate of transmission of the stream to the second node over the first network route.

According to another aspect of the present invention, there is provided a third node for controlling a rate of transmission of a stream over a first network route from a first, transmitting node to a second, recipient node; the third node comprising: a receiver arranged to receive further data at the third node from the first node over a second network route substantially overlapping with the first network route; processing apparatus configured to generate feedback regarding transmission of the further data to the third node over the second network route, for use by the first node to control a rate of transmission of the stream to the second node over the first network route; and a transmitter arranged to transmit the feedback from the third node to the first node.

In embodiments, the first node and/or third node may be further configured in accordance with any of the above method or program features.

BRIEF DESCRIPTION OF THE DRAWINGS

For a better understanding of the present invention and to show how it may be carried into effect, reference will now be made by way of example to the accompanying drawings in which.

DETAILED DESCRIPTION OF PREFERRED EMBODIMENTS

Figure 4B:
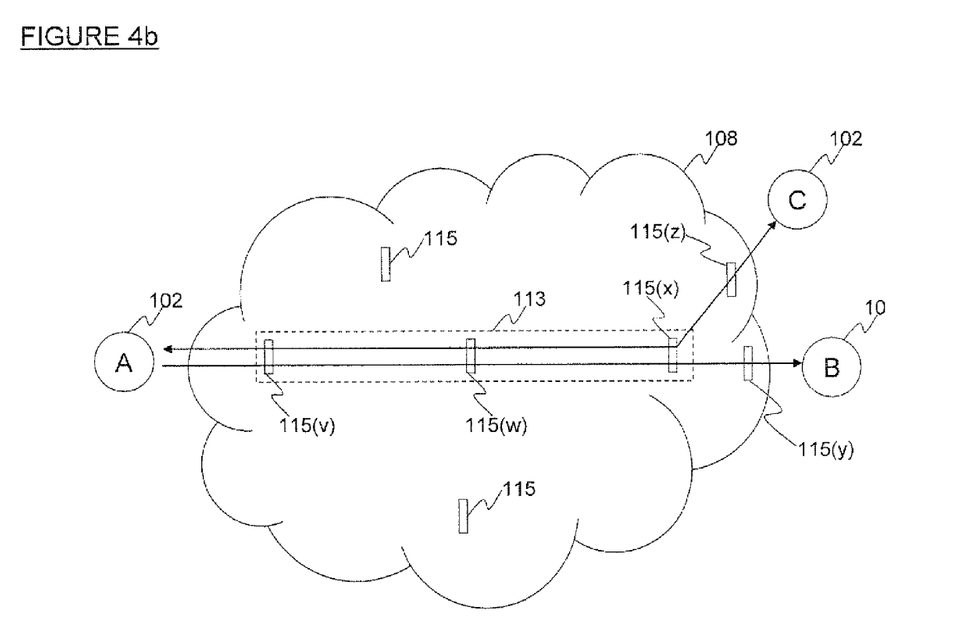
FIG. 4b is a schematic representation of a rate control mechanism using feedback from a third-party node.

Referring to FIG. 4b by way of a schematic example, when sending a data stream from a transmitting node A to a recipient node B in a communication system implemented over a packet-based network 108, and when B does not or cannot provide sufficient feedback, then the present invention makes use of a third node C to provide feedback for stream rate control. That is, A transmits some additional amount of data to C, receives feedback from C in response to that data, and controls the rate of transmission of the stream to B based on the feedback from C. This works on the idea that the route from A to C may be suitably overlapped with the route from A to B (e.g. in terms of network hops) that feedback from C regarding the channel conditions from A to C will approximately reflect the channel conditions from A to B, to a suitable extent such that that a rate control decision can be made based upon the feedback from C.

By making use of a third node C, the reliance on cooperation of the receiving node B for feedback can be circumvented to a large extent. This is of importance, for example, if nodes A and B have different rate control mechanisms implemented, or if B does not have a rate control mechanism available. Alternatively, the second node may have a functioning rate control feedback, but one which may benefit from supplementary feedback from the third node in addition to the feedback from the second node.

An exemplary rate control mechanism will be discussed in more detail shortly, but first an example of a suitable communication system in which such a mechanism could be implemented will be described in relation to FIGS. 1 to 3.

Figure 1:
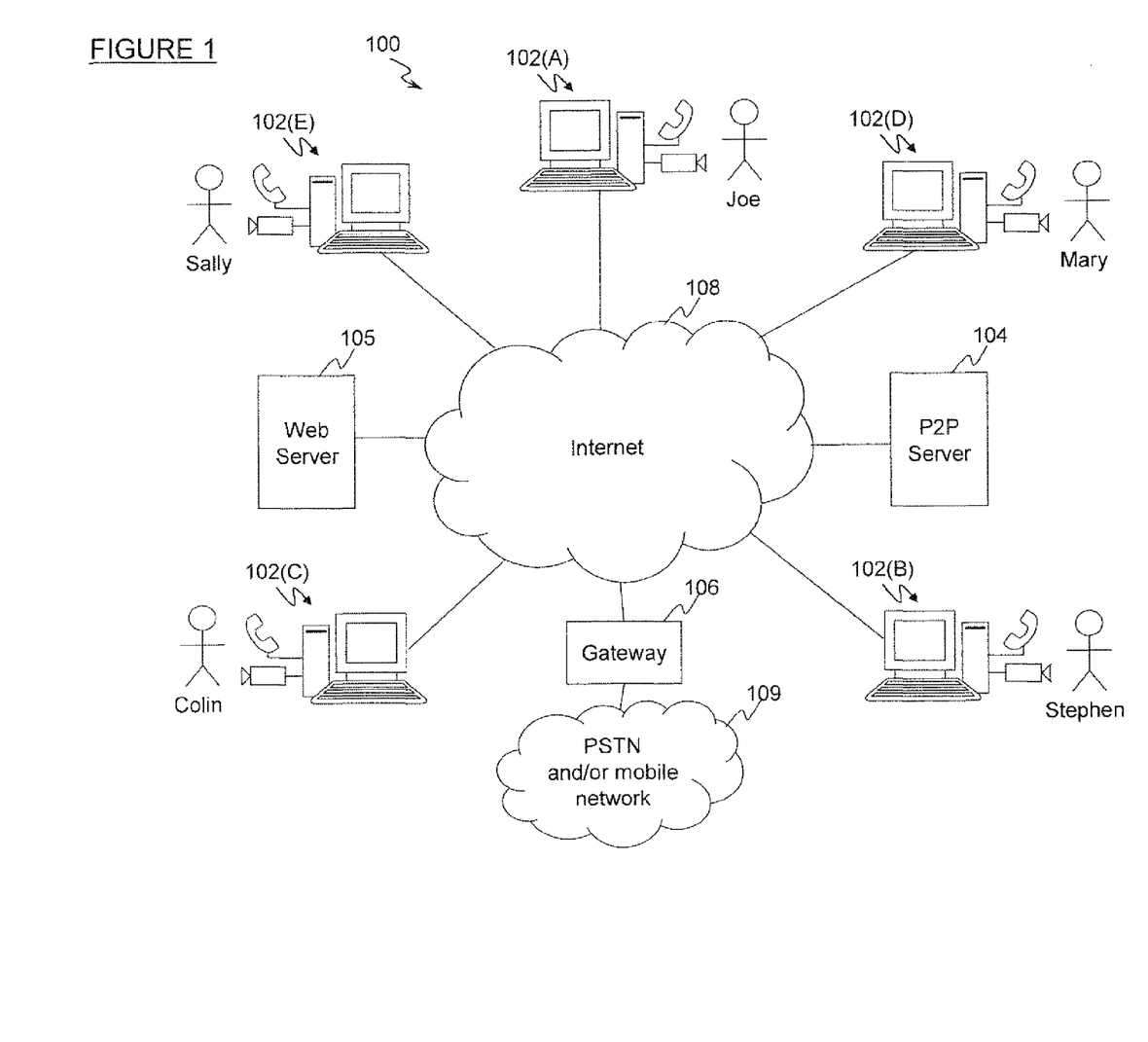
FIG. 1 is a schematic representation of a packet-based network such as the Internet.

FIG. 1 is a schematic illustration of a packet-based network 108 such as the Internet, which comprises a plurality of inter-connected elements such as those labelled 102, 104, 105 and 106. Each network element is inter-coupled with the rest of the Internet 108, and is configured to communicate data with other such elements over the Internet by transmitting and receiving data in the form of Internet Protocol (IP) packets. Each element also has an associated IP address locating it within the Internet. The elements shown explicitly in FIG. 1 are: a plurality of end-user terminals 102(A) to 102(E) (i.e. peers) such as desktop or laptop PCs or Internet-enabled mobile phones (nodes A to E for brevity); one or more P2P servers 104; one or more web servers 105; and a gateway 106 to another type of network 109 such as to a traditional Public-Switched Telephone Network (PSTN) or other circuit switched network, and/or to a mobile cellular network. However, it will of course be appreciated that many more elements make up the Internet than those explicitly shown. This is represented schematically in FIG. 1 by a communications cloud 108 which will include many other end-user terminals, servers and gateways, as well as routers of network service providers and Internet backbone routers.

Each of a plurality of the end-user terminals 102 is installed with communication software in the form of a P2P client application. When executed, this allows the end-user terminals 102 to establish communication channels with other such end-user terminals 102 via the Internet using P2P call set-up as discussed above (or more generally connection set-up). The P2P client applications also share presence information with one another, which provides an availability status of users. The presence information for each user is preferably at least in part defined by the user themselves. To supplement the decentralized call set-up, the P2P client application may retrieve some additional information from the P2P server 104, such as the authentication certificates as discussed above, contact lists which provide the names and user IDs of the users' contacts, "avatars" which are images chosen by users to represent themselves within the P2P system.

There may also be a P2P client application installed at one or more gateways 106 coupled to both the Internet 108 and one or more other networks 109 such as a PSTN network and/or a mobile cellular network. This allows the P2P client applications running on end-user terminals 102 to communicate with ordinary land-line telephones and/or mobile telephones respectively, even if those telephones themselves do not run P2P client applications and are not directly coupled to the Internet. In that case, the P2P client application on the terminal 102 sets up a connection over the Internet with the P2P client application on the gateway 106 using P2P call set-up and provides it with a phone number, and the gateway 106 uses the phone number to set up a connection with the telephone over the respective other network. Or in the other direction, a telephone user may dial into the gateway 106 with a number that identifies the user within the P2P system, and the gateway 106 will set up a connection with that user's terminal 102 over the Internet. In either case, a bidirectional communication channel can thus be established via the Internet and PSTN or mobile cellular network.

Each of the end-user terminals 102 may also be installed with other Internet-related software such as a web browser which, when executed, allows the user terminal 102 to retrieve information in the form of web pages from web servers 105 coupled to the Internet 108.

Figure 2:
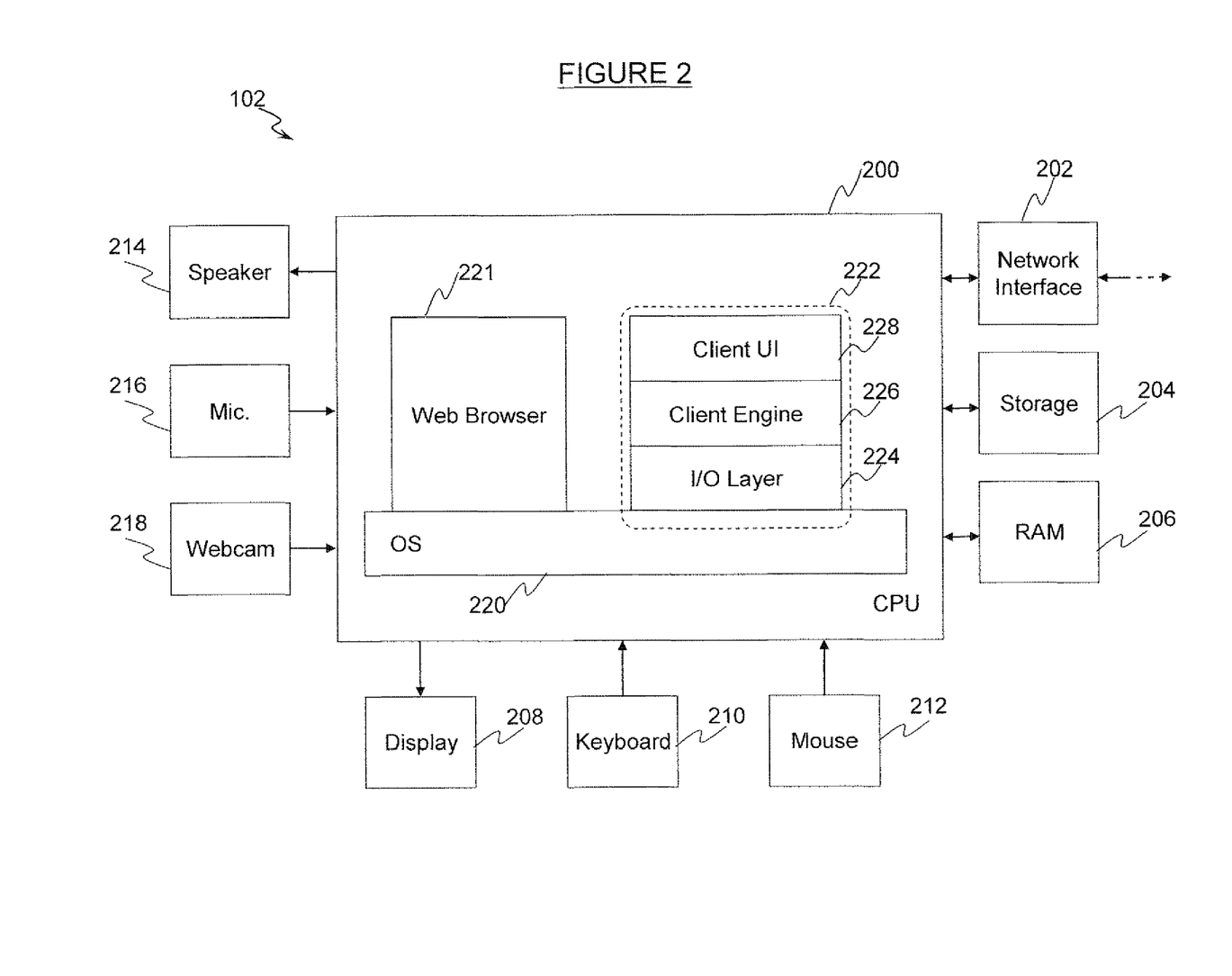
FIG. 2 is a schematic block diagram of a user terminal installed with a web-client application and P2P client application.

The schematic block diagram of FIG. 2 shows an example of an end-user terminal 102, which is configured to act as a terminal of a P2P system operating over the Internet. The terminal 102 comprises a processor or CPU 200 operatively coupled to: a network interface 202 such as modem for connecting to the Internet 108, a non-volatile storage device 204 such as a hard-drive or flash memory, and a volatile memory device such as a random access memory (RAM) 206. The terminal 102 also comprises one or more user input devices, for example in the form of a keyboard or keypad 210, a mouse 208, a microphone 216 and a webcam 218, each operatively coupled to the CPU 200. The terminal 102 further comprises one or more user output devices, for example in the form of a display screen 208 and speaker 214, again each operatively coupled to the CPU 200.

The storage device 204 stores software including at least an operating system (OS) 220, and packet-based communication software in the form of a P2P client application 222. The storage device may also store other Internet-related software such as a web-browser 221. On start-up or reset of the terminal 102, the operating system software 220 is automatically loaded into the RAM 206 and from there is run by being executed on the CPU 200. Once running, the operating system 220 can then run applications such as the web client application 221 and P2P client application 222 by loading them into the into the RAM 206 and executing them on the CPU 200. To represent this schematically in FIG. 2, the operating system 220, web client application 221 and P2P client application 222 are shown within the CPU 200.

The P2P client application 222 comprises a "stack" having three basic layers: an input and output (I/O) layer 224, a client engine layer 226, and a user interface (UI) layer 228. Each layer is responsible for specific functions. Because each successive layer usually communicates with two adjacent layers (or one in the case of the top layer), they are regarded as being arranged in a stack as shown in FIG. 2. The web client application 221 and P2P client application 222 are said to be run "on" the operating system 220. This means that in a multitasking environment they are scheduled for execution by the operating system 220; and further that inputs to the web client application 221 and the lowest (I/O) layer 224 of the P2P client application 222 from the input devices 202, 216 and 218 as well as outputs from web client application 221 and the I/O layer 224 of the P2P client application 222 to the output devices 202, 208 and 214 may be mediated via suitable drivers and/or APIs of the operating system 220.

The I/O layer 224 of the P2P client application comprises audio and/or video codecs which receive incoming encoded streams and decodes them for output to speaker 214 and/or display 208 as appropriate, and which receive unencoded audio and/or video data from the microphone 216 and/or webcam 218 and encodes them for transmission as streams to other end-user terminals 102 of the P2P system. The I/O layer 224 may also comprises a control signalling protocol for signalling control information between terminals 102 of the network.

The client engine 226 then handles the connection management functions of the P2P system as discussed above, such as establishing calls or other connections by P2P address look-up and authentication. The client engine may also be responsible for other secondary functions of the P2P system such as supplying up-to-date contact lists and/or avatar images of the user to the P2P server 104; or retrieving up-to-date contact lists of the user and retrieving up-to-date avatar images of other users from the P2P server 104. Further, the client engine may retrieve presence information from the other clients of the users in the contact list by periodically polling them via a public API, and reciprocally provide its own presence information when polled by those other clients that are online. Exchange of presence information directly between clients via a public API is the preferred option, but alternatively the presence information could be exchanged via an intermediate node such as a server 104.

The UI layer 228 is responsible for presenting decoded video to the user via the display 208, for presenting the output on the display 208 along with other information such as presence and profile information and user controls such as buttons and menus, and for receiving inputs from the user via the presented controls.

Figure 3:
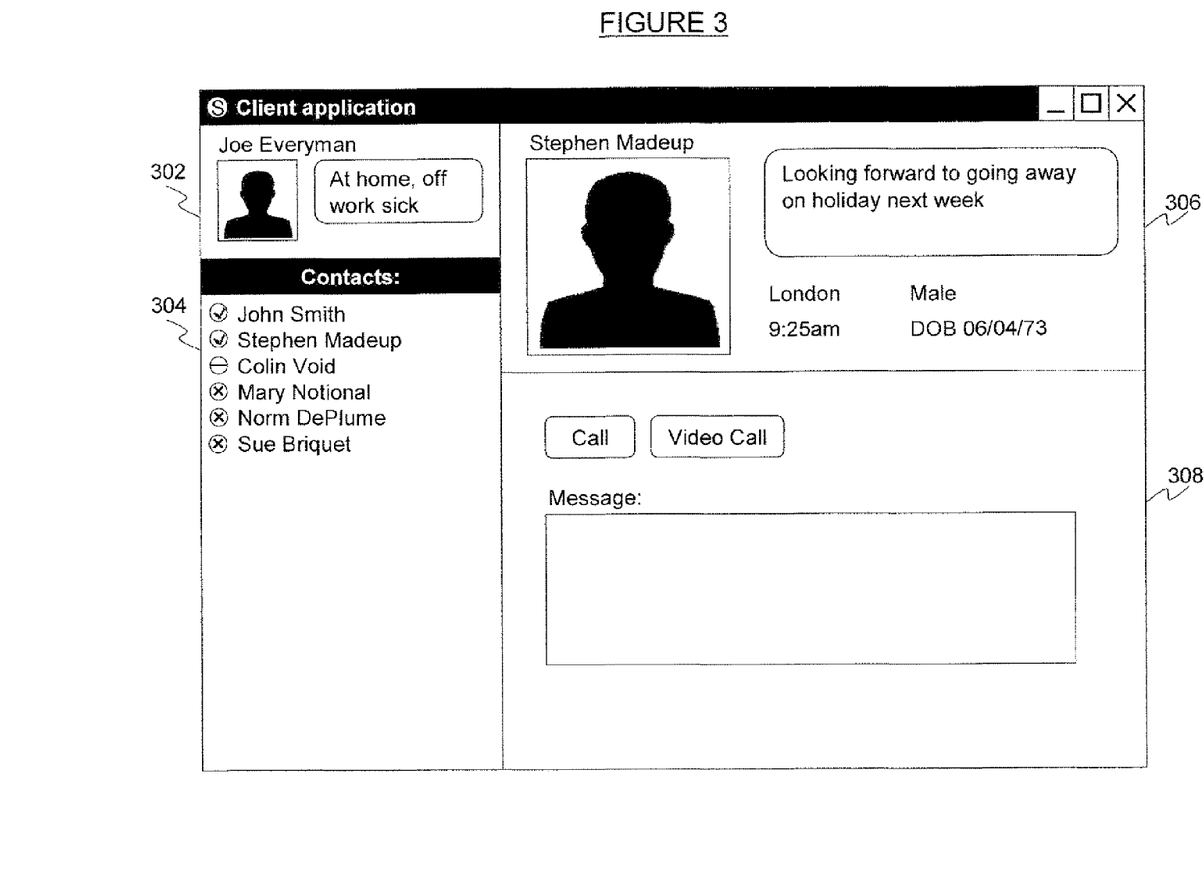
FIG. 3 is a schematic representation of a P2P client application user interface viewed on a user terminal.

FIG. 3 illustrates schematically an example user interface as would be presented to a user on the display 208 when the P2P client application 222 is open for viewing by the user. In this example, the user interface 228 is that of the P2P client application 222 running on a first user terminal 102(A). The user interface is divided into a number of panels. A first panel 302 displays some details of the user's own profile. A second panel 304 of the user interface displays a contact list of the user's friends or associates, these being other users of the P2P network. A third panel 306 of the user interface displays the profile of a selected user from the contact list. A fourth panel 308 of the user interface then displays communication controls in relation to the selected contact, such as buttons allowing a voice or video call to be established.

Returning to the problem of data rate control, as mentioned above, conventional mechanisms require that the recipient node cooperates by providing feedback about the transmission statistics in a pre-specified format. Referring to FIG. 4a, suppose for example that a transmitting node A wants to send a packet stream to another, recipient node B, but the channel bandwidth from A to B is unknown. Conventionally, a rate control mechanism would be implemented at A and B. According to a conventional transmitter based mechanism, A would send packets to B; and B would measure certain statistics such as loss or queuing delay on the received packet stream, and feed the statistics back to A. The transmitting node A would then determine a transmission rate based on the fed back statistics. Alternatively, according to a conventional receiver based mechanism, B would monitor the received packet stream and directly feeds back a suggested rate for A to use. However, as mentioned, both of these require that the recipient node cooperates by providing feedback to the transmitter according to some predetermined format or protocol, which may in fact not be available at B.

The present invention on the other hand is concerned with the problem whereby a suitable control mechanism is present only at A, but not at B, so that B can neither return the required statistics for a transmitter based scheme to work, nor a suggested rate as would be required for a receiver based scheme. A similar problem may occur if B did have a rate control mechanism but only one which was not compatible with the mechanism at A.

Figure 5:
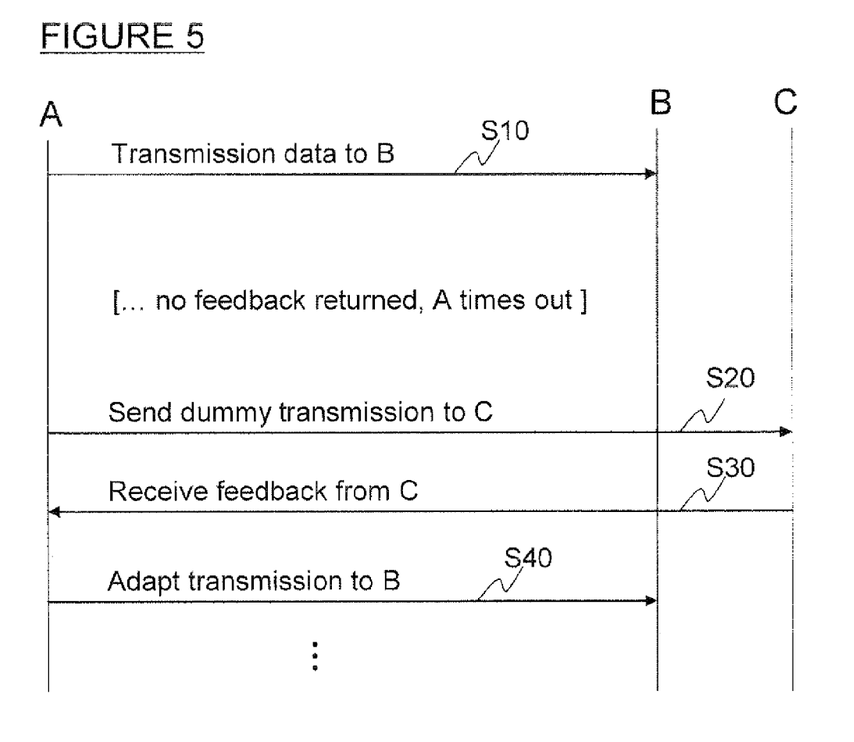
FIG. 5 is a signalling chart showing a rate control mechanism using feedback from a third-party node.

An example of a preferred scheme will be described in relation to the schematic diagram of FIG. 4b and signalling chart of 5. Here, the transmitting node A is to transmit a data stream to the recipient node B with the help a third-party node C for feedback. The stream in question could be any user content such as a live voice call or video call, or other live voice or video stream, or a file transfer. In one embodiment, each of the transmitting node A, recipient node B and third-party node C is an end-user node 102, in which case the relevant parts of the mechanism are preferably implemented in the I/O layer 224 of the client 222 on the nodes A, B and C respectively (and preferably all parts of the mechanism are implement on each node A, B and C such that any of them can act as transmitter, recipient or third-party for any other node). However, in alternative embodiments for example, the third-party node C could be a server such as the P2P server 104 or dedicated server provided for the purpose of rate control feedback, and/or the transmitting node could be a server such as web server 105 streaming video or downloading files to a user.

The transmitting node A first establishes a connection with the recipient node B, e.g. by P2P connection set-up as discussed above. After that, preferably the first step S10 is for the transmitting node A to determine whether or not the recipient node B has a suitable rate control feedback mechanism available itself, compatible with that of the transmitting node A.

If supported by the relevant protocol between A and B, one way to do this would be for A to transmit an explicit query message to B to detect before beginning transfer of the stream whether the appropriate rate control feedback mechanism is supported by the recipient B, and for B to respond with an explicit response message indicating whether the mechanism is supported. If so, A will begin transmission of the stream to B using feedback directly from B for rate control in the more conventional manner. If not, it uses C for feedback as will be discussed in more detail shortly.

Another way would be to begin transmitting data to B (either some arbitrary test data or the stream itself at some initial default rate), and to detect whether the required feedback is returned. If the feedback mechanism is present at B, then B will respond with a rate-control feedback message and A will begin or continue transmission of the stream to B using feedback directly from B for rate control in the move conventional manner. If on the other hand no rate-control feedback message is returned from B, then A can determine that the mechanism is not supported by B based on a timeout. This is the option illustrated in FIG. 5 for illustrative purposes.

Assuming the relevant feedback mechanism is not supported by B, then a third-party node C is used to provide the required feedback instead of B. That means, as well as transmitting the desired stream itself to B (i.e. the actual user content), the transmitting node A also sends some additional amount of data to C, then C returns a rate-control feedback message based on that transmission to C, and determines a suitable rate for the transmission to B based on the feedback message from C. The additional data sent to C may be arbitrary "dummy" data having no other purpose than obtaining feedback from the third node, and having no particular content; but the option of this data also having some other purpose or meaning is not excluded.

It is advantageous if C is physically close to B so that the network path from A to B coincides with the path from A to C as much as possible. The 'proximity' may be determined by IP address, hops and/or round trip time.

The transmitting node A may select which third-party node C to use by reference to a look-up table mapping suitable third-party nodes to potential recipients based on a predetermined assessment of network 'proximity'. The look-up table may be distributed amongst end-users in a peer-to-peer fashion or more centrally available at one or more servers. Alternatively, the transmitting node A may execute an algorithm which finds a suitably 'proximate' third-party node analytically, e.g. based on IP address. Once selected, the transmitting node A sets up a connection with the third-party node C, e.g. by P2P connection set-up as discussed above.

Thus it may be said that the network route from A to B substantially overlaps with the route from A to C. In terms of effect, this means that a packet sent over one route is likely to experience the same channel bandwidth and/or bottlenecks as that of a packet sent over the other route.

Referring to FIG. 4b, in terms of what is physically going on, in embodiments the two routes A-B and A-C may share a portion 113 comprising at least one "core" or "trunk" hop between at least two service provider routers 115, and potentially a plurality of core hops between at least three such service provider routers (and potentially a number more). A large network such as the Internet 108 comprises a plurality of routers 115, which may be service provider routers such as backbone routers and routers of Network Service Providers (NSPs) and Internet Service Providers (ISPs). These are distinct from home routers or internal routers of Local Area Networks (LANs) or wireless LANs (WLANs), for example in that they exist outside a private network to provide commercially available access, and are not just "edge" routers. Local service providers connect to regional service providers, which in turn connect to national or global service providers, and the networks of the different national or global service providers are connected by backbone networks. In addition, some regional networks may directly connect with each other, bypassing the backbone networks. Larger NSPs provide the national or global networks and sell bandwidth to regional NSPs, which then resell bandwidth to local ISPs, who in turn sell and manage services to end users.

Thus the shared, overlapping part 113 of the route from A to B and C does not only include the first hop from the transmitting node A to the first service provider router 115(v), but also includes at least the second hop from the first service provider router 115(v) to a second service provider router 115(w) onwards, preferably including one or more further core hops from the second router 115(w) to one or more further service provider routers 115(x). The routes may then branch at some final stage via two different routers 115(y) and 115(z) respectively.

The core, service provider routers 115 are typically regional or international routers; and so the shared, overlapping part 113 of the route from A to B and C preferably includes at least one international hop.

The term "service provider router" will be used herein to refer to any router other than a home router, private LAN router or LAN subnet router or the like; i.e. any router of a regional or global network service provider or backbone router or such like, which may be thought of as "core" or "trunk" routers not for home, local or private use.

Note however that in some embodiments, there need not necessarily be many common hops on the two routes for them to be said to "substantially overlap". Rather, it is important that the two differing branches are short. Thus there being at least two common hops is not a requirement. In fact, in the vast majority of calls, the constraining factor is in the first part of the route, i.e. the transmitting node A's uplink. So referring to FIG. 4b for example, the constraining factor in most cases and therefore the substantially overlapping part of the route need only be from the transmitting node A to the first node 115(v). This may be the case even if the first router 115(v) is not a service provider router, but rather a home router or LAN router for example. In fact, the proposed method will work as long as the differing router 115(y) or differing routers is or are at least as fast the slowest of the common router or routers 115(v), 115(w), 115(x), and 115(z).

Other ways in which the second network route can be said to substantially overlap with the first network route are if the second node and third node share at least one of: the same LAN, the same WLAN, the same local ISP, the same mobile data quality-of service (QoS) profile, or the same cell of a cellular communication system.

Once the appropriate third-party node C has been determined and connected with, then the transmitting node A can begin the process of transmission using third-party node assisted rate control. In one embodiment the transmitting node A may require some initial feedback from C before beginning transfer of the stream to B, or in an alternative embodiment may begin with some initial default rate and subsequently adapt the rate based on the feedback. Either way, preferably further feedback is used to adapt the rate multiple times throughout the duration of the call. This is particularly useful in the case where the stream is a real-time stream such as a live voice or video call, in order to provide dynamic "on the fly" adaptation to changing channel conditions.

Thus at a step S20, the transmitting node A sends some data to the third-party node C, which may be arbitrary "dummy" data. At step S30, C returns feedback information to A based on the channel from A to C, and the transmitting node A determines a suitable rate for transmission of the stream over the channel from A to the recipient node B based on the feedback from C. At Step S40, the transmitting node A then transmits at least a portion of the stream to the recipient node B using the newly determined rate.

Steps S20 to S40 are preferably repeated one or more times throughout the transmission of the stream, preferably periodically.

In the case of a live voice or video stream, the rate can be varied for example by varying the coding rate of the codec, e.g. by varying the quality or image size. In the case of a file transfer, the rate can be varied by varying the speed of the transfer (i.e. length of time taken).

The invention may be implemented in either a transmitter-based manner or a receiver-based manner.

In a transmitter based scenario, A will periodically send small amounts of data to C in between the data sent to B. The data contents may be arbitrary. Because the major part of the network path is common, network congestion will be approximately the same from A to C as from A to B, and therefore the statistics measured at C are fed back and used by A to determine a suitable rate for transmission over the channel from A to B assuming the same statistics are approximately applicable. The statistics returned by C could comprise for example a measure of loss such as packet loss, queuing delay, etc. over the channel from A to C. Techniques for determining such statistics and for determining a rate based thereon will be familiar to a person skilled in the art, by analogy to known transmitter-based techniques but uniquely being based on feedback from the third-party node C instead of from the recipient node B.

A receiver based scenario will work in a similar way but C will measure the available bandwidth, based on small amounts of traffic sent from A to C in between the data from A to B, and return that measure to A. The measure of available bandwidth can be taken by A as a direct indication of the rate suitable for use on that channel, and therefore an approximation of the rate suitable for use on the channel to B. Techniques for determining a rate or bandwidth for feedback to A will be familiar to a person skilled in the art, by analogy to known receiver-based techniques but uniquely based on feedback from the third-party node C instead of from the recipient node B.

The efficacy and precision of the scheme can be further improved by letting the data sent to C describe the amount of data recently sent to B. That is, C is told about the rate being sent to B, which is useful in receiver-based embodiments so that the rate control feedback mechanism at C can take that traffic into account when calculating the rate or bandwidth to feed back to the transmitter A.

There may be a number of ways of implementing such a calculation, but one example is described below in relation to FIGS. 6 to 9.

Figure 6:
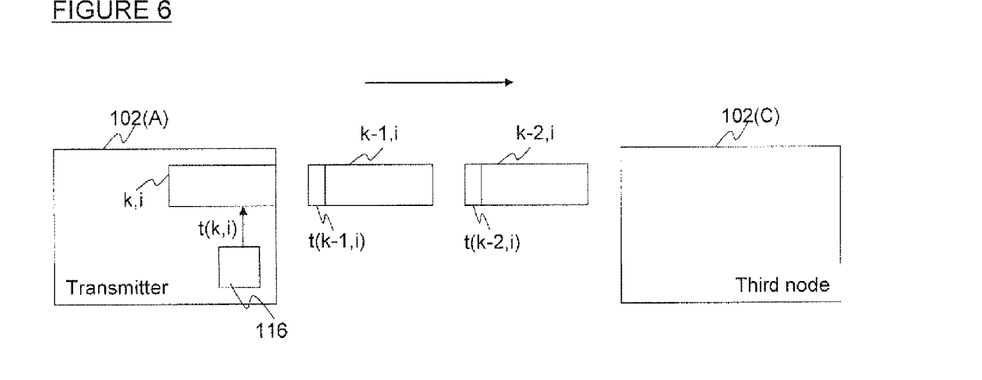
FIG. 6 is a schematic diagram illustrating flow of packets between a transmitter and a third-party node.

FIG. 6 is a highly schematised diagram illustrating the flow of packets between a transmitting node A and a third node C. In the packet stream, the sequence numbers of the packets are denoted using k. FIG. 6 illustrates a packet (k,C) about to be transmitted, and the two preceding packets already having been transmitted. The packets are conveyed from the transmitter A to the third node C over a channel with a certain bandwidth. The transmitter A has a clock 116 which is used to provide timing information associated with transmitted packets. This can be in the form of timestamps within each packet, or can be provided as additional side information, preferably piggybacked to the packet in question. This is shown schematically in FIG. 6 where the side information is denoted t(k,C) for the sequence number k of the appropriate packet. The transmission time of a packet with sequence number k in a stream going to the third node C is denoted by Tx(k,C) and is the clock reading. Where timestamps are not provided, side information t(k,C) is encoded and quantised as described below.

Figure 7:
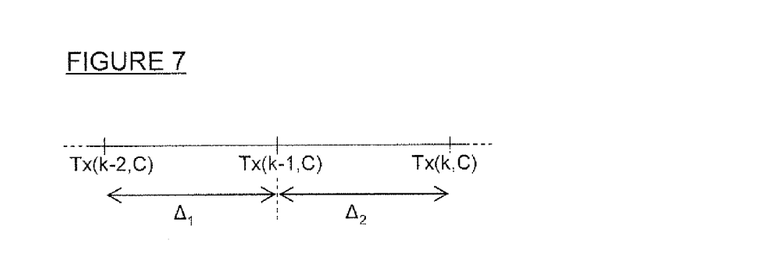
FIG. 7 is a diagram illustrating the timing of transmission of packets from a transmitting node.

FIG. 7 is a timing diagram illustrating how in one particular embodiment the transmission time Tx(k,C) can be recursively recovered at the third node C. It can be seen from FIG. 7 that transmission time Tx(k,C) is a delay $\Delta_2$ after the transmission time of the preceding packet Tx(k−1,C). Generally, the delay between packets is near constant, that is $\Delta_2$ is more or less equal to $\Delta_1$, the delay between the earlier two preceding packets. Thus, an estimate for $\Delta_2$ can be obtained by the following:

$$\alpha(Tx(k-1,C)-Tx(k-2,C))$$

where $\alpha$ is less than or equal to 1. Then, $$Tx(k,C)=Tx(k-1,C)+\Delta_2+t(k,C).$$

The t(k,C) is calculated, quantised and transmitted, allowing Tx(k,C) to be recursively recovered from the following equation:

$$Tx(k,C)=Tx(k-1,C)+\alpha(Tx(k-1,C)-Tx(k-2,C))+t(k,C).$$

Figure 8:
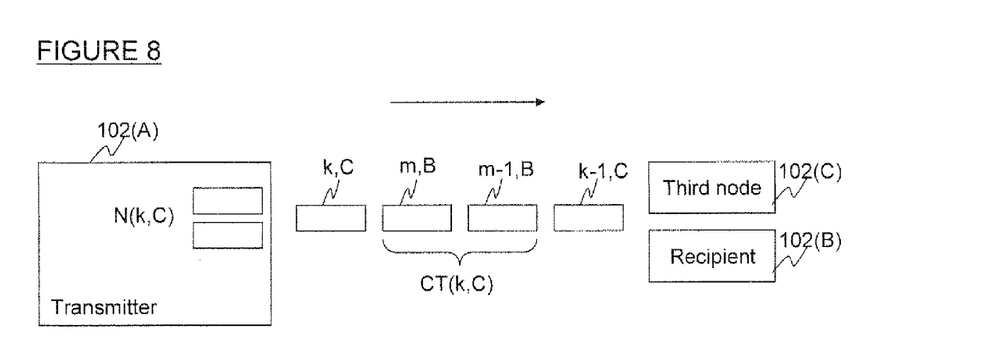
FIG. 8 is a schematised diagram illustrating cross-traffic between a transmitter, recipient node and third-party node.

For use in the third-party node assisted rate control, the amount of "cross traffic" is preferably encoded, quantised and transmitted along with the outgoing packet stream to C. FIG. 8 illustrates the concept of cross traffic which, in this situation, is an indication of the amount of traffic sent to the recipient B. FIG. 8 illustrates the recipient node B of the stream and the third node C, both of which are receiving packets from transmitter A.

One particular definition of cross-traffic for packet k sent to the third node C is:

$$CT(k,C)=\text{sum}_{m,j}(S(m,B)), \text{ with } m \neq k \text{ and } Tx(k-1,C)<Tx(m,B)<Tx(k,C) \quad \text{Equation (1)}$$

where S(m,B) is the size of packet m going to recipient B. This is the amount of data sent to the recipient B in between packets k−1 and k sent to the assisting third node C. The CT(k,C) cross-traffic can be encoded in various ways, for example relative to S(k,C) or relative to an estimate of the total channel capacity.

In order to describe a technique for estimating the bandwidth between the transmitter A and third node C, reference will now be made to FIG. 9 which incorporates an estimation function at the third node C.

Figure 9:
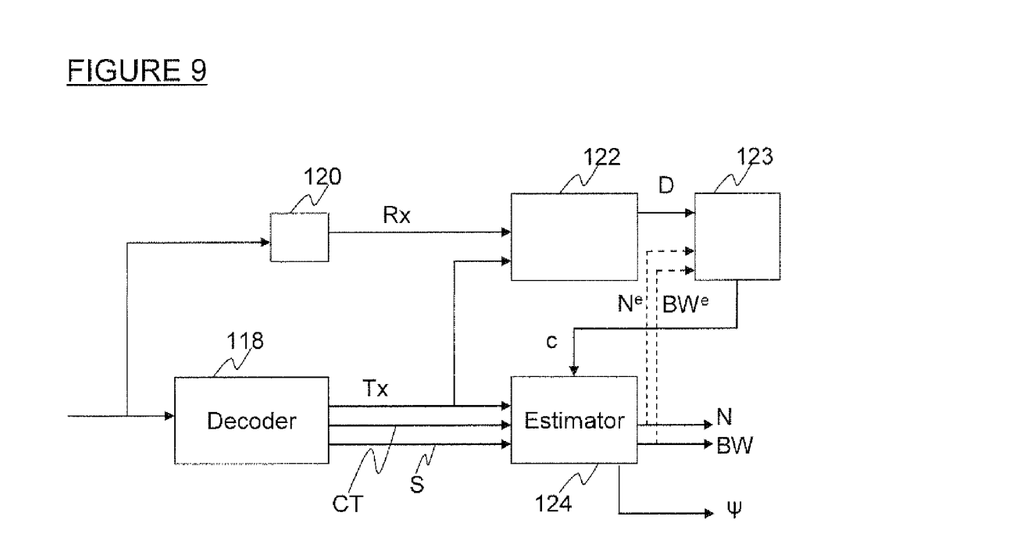
FIG. 9 is a schematic block diagram of a portion of a third-party node to implement one embodiment of the invention.

FIG. 9 illustrates a schematic block diagram of functional blocks at the I/O layer 224 of the third node C. A decoder 118 receives a packet and decodes the encoded side information concerning transmission time to obtain an estimate of the transmission time of the packet Tx(k,C). Also, a local clock 120 provides a reading denoting the arrival time of the packet, Rx(k,C). From these two quantities, it is possible to compute the raw packet delay:

$$D(k,C)=Rx(k,C)-Tx(k,C)$$

A separate calculation function 122 can be provided for this in certain embodiments for clock offset. It will be appreciated that it is effectively taken into account in any event in the following analysis.

Of course, $D(k,C)$ is not an accurate measurement of the actual transmission delay, because $Rx(k,C)$ and $Tx(k,C)$ are measured with respect to different, non-synchronised clocks. $D(k,C)$ can be described by:

$$D(k,C)=Dx(k,C)+c(k,C)$$

where $Dx(k,C)$ is the true delay and $c(k,C)$ is the measurement error due to clocks not being synchronised. The assumption is made herein that although $c(k,C)$ is unknown, it is close to constant over time.

The third node C includes an estimation function 124 which receives a series of observations for each of $Tx(k,C)$, $Rx(k,C)$, $CT(k,C)$ and $S(k,C)$. It will be appreciated that $CT(k,C)$ is encoded, quantised and transmitted with the packet stream. $S(k,C)$ is readily available in any packet based system: it is the total packet sizes (e.g. in bytes) which is required for meaningful reception of data typically, it is in the IP header, These observations are used to provide estimates for the bandwidth of the channel to C, $BW(C)$; the amount of data $N(k,C)$ in the channel packet queue at time $Tx(k,C)$; and the measurement error due to clocks not being synchronised, $c(k,C)$. The estimation is based on the following theory.

Assume that the total outgoing packet stream of the transmitter is limited by a channel with bandwidth $BW(C)$, and that this channel employs packet queuing when overloaded. Thus it is written:

$$Dx(k,C)=N(k,C)/BW(C)+e(k,C)$$

or equivalently, $$D(k,C)=N(k,C)/BW(C)+c(k,C)+e(k,C) \quad \text{Equation (2)}$$

Here, $N(k,C)$ is the amount of data in the channel packet queue at time $Tx(k,C)$, i.e. immediately after packet $(k,C)$ is loaded on the channel. That is, the true transmission delay of a packet is determined by the amount of traffic that must be transmitted, divided by the channel transmission speed. $e(k,C)$ is measurement noise, due to quantization noise in $Tx(k,C)$ and channel disturbances.

In turn it can be written:

$$N(k,C)=\max(N(k-1,C)+CT(k,C(Tx(k,C)-Tx(k-1,C))\\ *BW(C),0)+S(k,C) \quad \text{Equation (3)}$$

where we assume a steady loading of the cross traffic $CT(k,C)$ over the time interval $[Tx(k-1,C),Tx(k,C)]$. Equation (3) says that prior to loading packet $(k,C)$, the amount of traffic in the channel packet queue equals:

what was there last time a packet was put in
minus what the channel was able to process since then
plus any cross traffic added in the same interval
and that the amount of traffic can never become negative.

The estimator uses equations (2) and (3) for estimating $BW(C)$, $N(k,C)$ and $c(k,C)$ using the series of observations which are supplied to the estimator by $Tx(k,C)$, $Rx(k,C)$, $CT(k,C)$ and $S(k,C)$.

One implementation for the estimator 124 is to see the equations as the basis for a Kalman filter, and solve them as an extended, unscented or particle Kalman filter. The preferred implementation applies an unscented Kalman filtering. One advantage of Kalman filtering is that it readily provides error covariance matrices $R(C)$ for the estimates of $BW(C)$, $N(k,C)$, as well as t-test statistics $T(C)$ for the validity of the model from which equations (2) and (3) are derived. This extra information provides insight about the confidence of the resulting estimates, providing estimate confidences $\psi$.

A Kalman filter allows the equations to be solved in a recursive fashion for each set of observations. It would be possible to use other methods of recursive calculation, Alternatively, it would be possible to store values for the observations over a period of time and use successive sets to solve the equation by numerical analysis.

It is possible to improve operation of the estimator by eliminating the clock error $c(k,C)$ from equation (2). Referring still to FIG. 9, the calculation function 122 is illustrated which receives values for $Tx(k,C)$ and $Rx(k,C)$ and calculates the perceived delay $D(k,C)$ for each set of observations. A minimum tracking function 123 observes the one way delays $D(k,C)$ to generate an estimated compensation for the clock $c(k,C)$. In one embodiment, the minimum tracking function 123 is implemented as a Kalman filter which models $c(k,C)$ as a first order model to grasp any clock drift. Minimum tracking is obtained by employing higher observation noise in the Kalman filter for higher values of $D(k,C)$. The estimated clock offset c is supplied to the estimator 124 which can then internally subtract the clock offset $c(k,C)$ from $D(k,C)$. This allows the clock offset to be removed from the Kalman filter state, effectively decoupling errors in $c(k,C)$ from estimates of $BW(k,C)$ and $N(k,C)$, which may accumulate due to imperfections in the handling of the non-linearity of equation (3). Moreover, reducing the state reduces computational complexity of the Kalman filter.

In an improved version, the delays $D(k,C)$ are first compensated for expected network delay, so that the minimum of $D(k,C)-[N(k,C)]^e/[BW(C)]^e$, where $[N(k,C)]^e$ and $[BW(C)]^e$ denote current estimates of $N(k,C)$ and $BW(C)$ respectively, is tracked.

The estimated bandwidth $BW(C)$ is fed back from the third node C to the transmitting node A and can then be used by the transmitter to control the rate of transmission of the stream from A to the recipient node B.

It will be appreciated that the above embodiments are described only by way of example.

For instance, although the above has been described in terms of end-user nodes 102(A . . . C), any of these nodes could alternatively be other types such as servers. For example, the third-party node C can be a peer, a support node, or a dedicated server for the purpose. In an alternative embodiment there may be more than one node third-arty node C used, which could reduce anomalies, at the expense of bandwidth. Alternatively or additionally, the transmitting node A could be server such as a web server 105 instead of end-user node 102.

Note also that the term "third-party" node used above is meant only to mean a node other than the transmitter and recipient of the stream, and does not imply anything about the relationship of the users or operators of those nodes. The third-party node could be owned or run by different users or operators than either the transmitting node and/or recipient node, or could be owned or run by the same user or operator as either the transmitting node and/or recipient node.

The above has been described in terms of the second node B having no feedback mechanism or an incompatible feedback mechanism. In other embodiments however, the first node A and second node B may have a compatible, but poor, mechanism. The invention may alternatively therefore employ the third node C for better control, even if it would not have been impossible to use the second node B to provide its own feedback. In that case, the first node A and third node C both support a mechanism that is preferred over any mechanism supported by both the first node A and second node B. In certain embodiments, the third node C may even provide feedback in addition to the feedback from B, in order to supplement the feedback from B.

In further embodiments, there may be provided a safety mechanism. Preferably, any recipient such as the second node, B, returns a round trip time (RTT) and a loss report to the first, transmitting node A. The transmitter A is configured to detect if either of these grow very high (above some predetermined threshold). If so, then this is a sign that the "similar path" assumption is invalid, and therefore in response the transmitter stops using the third node C for feedback and instead reverts to whatever mechanism B supports.

Although the above has been described mainly in terms of a peer-to-peer (P2P) system, the present invention is not specific to P2P and may be applied to any kind of packet-based communications system, such as more the centralised VoIP systems mentioned previously. Further, the present invention is not limited to use over the Internet, but could be implemented over any packet-based network.

Other configurations and applications of the present invention may be apparent to the person skilled in the art given the disclosure herein. The scope of the invention is not limited by the described embodiments, but only by the appended claims.

The invention claimed is:

1. A method of controlling a rate of transmission from a first, transmitting node to a second, recipient node; the method comprising:
   transmitting a stream from the first node to the second node over a first network route;
   transmitting further data from the first node to a third node over a second network route substantially overlapping with the first network route, the further data comprising data that is different from data of the stream data;
   receiving feedback at the first node from the third node regarding transmission of the further data to the third node over the second network route;
   based on said feedback from the third node, controlling a rate of transmission of the stream to the second node over the first network route; and further comprising:
   detecting a measure indicative of whether a network route substantially overlaps with another network route, and if not switching to an alternative mode of operation in which a rate of transmission is controlled based on feedback from a node that receives a transmitted stream without feedback from a different node that does not receive the transmitted stream.

2. The method of claim 1, wherein the third node is not a recipient of said stream.

3. The method of claim 1, wherein the rate of transmission to the second node is controlled without feedback from the second node.

4. The method of claim 1, wherein said further data is formed of dummy data.

5. The method of claim 1, wherein said measure comprises at least one of: a round trip time and a measure of data loss over the first network route.

6. The method of claim 1, wherein the second network route substantially overlaps with the first network route in that the routes share at least an initial uplink hop.

7. The method of claim 1, wherein the second network route substantially overlaps with the first network route in that the routes share at least one hop between service provider routers.

8. The method of claim 7, wherein the second network route substantially overlaps with the first network route in that the routes share a plurality of hops between service provider routers.

9. The method of claim 1, wherein the second network route substantially overlaps with the first network route in that the routes share at least one hop beyond a portion of the route from the transmitting node to a first service provider router.

10. The method of claim 1, wherein the second network route substantially overlaps with the first network route in that the routes share at least one international hop.

11. The method of claim 1, wherein the second network route substantially overlaps with the first network route in that the routes share at least hop between wide area networks.

12. The method of claim 1, wherein the first and second network routes each comprise a plurality of routers, and the second network route substantially overlaps with the first network route in that the routes share at least the slowest router of each route.

13. The method of claim 1, wherein the second network route substantially overlaps with the first network route in that the second node and third node share at least one of: the same LAN, the same WLAN, the same local ISP, the same mobile data quality-of service profile, or the same cell of a cellular communication system.

14. The method of claim 1, wherein the first node is an end-user node.

15. The method of claim 1, wherein the second node is an end-user node.

16. The method of claim 1, wherein the third node is an end-user node.

17. The method of claim 1, wherein the third node is a server.

18. The method of claim 1, wherein the first node is a server.

19. The method of claim 1, wherein the first node and third node both support a rate control mechanism that is preferred over any rate control mechanism supported by both the first node and the second node.

20. The method of claim 1, wherein the first node transmits the further data to the third node periodically in between transmitting data of said stream to the second node.

21. The method of claim 1, wherein the method of rate control is transmitter-based such that said feedback from the third node comprises at least one or more statistics of the route between the first and third node, and the first node determines the rate of transmission to the second node based on said one or more statistics.

22. The method of claim 21, wherein said one or more statistics comprise at least one of a loss rate and a queuing delay.

23. The method of claim 1, wherein the method of rate control is receiver based, such that said feedback from the third node comprises an indication of the specified rate or bandwidth of the route between the first and third node, and said first node uses the specified rate or bandwidth as the rate of transmission to the second node.

24. A method of controlling a rate of transmission from a first, transmitting node to a second, recipient node; the method comprising:
   transmitting a stream from the first node to the second node over a first network route;
   transmitting further data from the first node to a third node over a second network route substantially overlapping with the first network route, the further data comprising data that is different from data of the stream data;

receiving feedback at the first node from the third node regarding transmission of the further data to the third node over the second network route; and based on said feedback from the third node, controlling a rate of transmission of the stream to the second node over the first network route;

wherein the second node has no rate control mechanism compatible with that of the first node.

25. The method of claim 24, comprising determining whether the second node has a rate control mechanism compatible with the first node, and selecting to use said third node for feedback on condition of said detection.

26. The method of claim 25, wherein said determination is performed by transmitting data from the first node to the second node and detecting whether a rate control feedback message is returned from the second node to the first node within a timeout period.

27. The method of claim 25, wherein said determination is performed by transmitting a query message from the first node to the second node, and receiving back a response message from the second node to the first node indicating whether the second node has a compatible rate control mechanism.

28. A method of controlling a rate of transmission from a first, transmitting node to a second, recipient node; the method comprising:

transmitting a stream from the first node to the second node over a first network route;

transmitting further data from the first node to a third node over a second network route substantially overlapping with the first network route, the further data comprising data that is different from data of the stream data;

receiving feedback at the first node from the third node regarding transmission of the further data to the third node over the second network route; and based on said feedback from the third node, controlling a rate of transmission of the stream to the second node over the first network route;

wherein said further data transmitted to the third node comprises an indication of an amount of data sent in said stream to the second node, and said feedback from the third node to the first node is based on the indication of said amount.

29. A computer program product for controlling a rate of transmission from a first, transmitting node to a second, recipient node; the program comprising code embodied on a computer-readable hardware medium and configured so as when executed on the first node to:

transmit a stream from the first node to the second node over a first network route;

transmit further data from the first node to a third node over a second network route substantially overlapping with the first network route, the further data not comprising data of the stream;

receive feedback at the first node from the third node regarding transmission of the further data to the third node over the second network route;

based on said feedback from the third node, control a rate of transmission of the stream to the second node over the first network route; and further comprising:

detect a measure indicative of whether a network route substantially overlaps with another network route, and if not switching to an alternative mode of operation in which a rate of transmission is controlled based on feedback from a node that receives a transmitted stream without feedback from a different node that does not receive the transmitted stream.

30. A first node for controlling a rate of transmission from the first node to a second, recipient node; the first node comprising:

a transmitter arranged to transmit a stream from the first node to the second node over a first network route, wherein the transmitter is configured to transmit further data from the first node to a third node over a second network route substantially overlapping with the first network route, the further data being different from data of the stream;

a receiver arranged to receive feedback at the first node from the third node regarding transmission of the further data to the third node over the second network route; and processing apparatus configured to control, based on said feedback from the third node, a rate of transmission of the stream to the second node over the first network route and to detect a measure indicative of whether a network route substantially overlaps with another network route, and if not switch to an alternative mode of operation in which a rate of transmission is controlled based on feedback from a node that receives a transmitted stream without feedback from a different node that does not receive the transmitted stream.

31. The first node of claim 30, wherein the transmitter is arranged not to transmit said stream to the third node.

32. The first node of claim 30, wherein the processing apparatus is configured to control the rate of transmission to the second node without feedback from the second node.

33. The first node of claim 30, wherein said further data is formed of dummy data.

34. The first node of claim 30, wherein said measure comprises at least one of: a round trip time and a measure of data loss over the first network route.

35. The first node of claim 30, wherein the second network route substantially overlaps with the first network route in that the routes share at least an initial uplink hop.

36. The first node of claim 30, wherein the transmitter is arranged to transmit the further data such that the second network route substantially overlaps with the first network route in that the routes share at least one hop between service provider routers.

37. The first node of claim 30, wherein the transmitter is arranged to transmit the further data such that the second network route substantially overlaps with the first network route in that the routes share a plurality of hops between service provider routers.

38. The first node of claim 30, wherein the transmitter is arranged to transmit the further data such that the second network route substantially overlaps with the first network route in that the routes share at least one hop beyond a portion of the route from the transmitting node to a first service provider router.

39. The first node of claim 30, wherein the transmitter is arranged to transmit the further data such that the second network route substantially overlaps with the first network route in that the routes share at least one international hop.

40. The first node of claim 30, wherein the transmitter is arranged to transmit the further data such that the second network route substantially overlaps with the first network route in that the routes share at least hop between wide area networks.

41. The first node of claim 30, wherein the first and second network routes each comprise a plurality of routers, and the transmitter is arranged to transmit the further data such that the second network route substantially overlaps with the first network route in that the routes share at least the slowest router of each route.

42. The first node of claim 30, wherein the transmitter is arranged to transmit the further data such that the second network route substantially overlaps with the first network route in that the second node and third node share at least one of: the same LAN, the same WLAN, the same local ISP, the same mobile data quality-of service profile, or the same cell of a cellular communication system.

43. The first node of claim 30, wherein the first node is an end-user node.

44. The first node of claim 30, wherein the transmitter is arranged to transmit said stream to an end-user node being said second node.

45. The first node of claim 30, wherein the transmitter is arranged to transmit said further data to an end-user node being said third node.

46. The first node of claim 30, wherein the transmitter is arranged to transmit said further data to a server being said third node.

47. The first node of claim 30, wherein the first node is a server.

48. The first node of claim 30, wherein the first node and third node both support a rate control mechanism that is preferred over any rate control mechanism supported by both the first node and the second node.

49. The first node of claim 30, wherein the transmitter is arranged to transmit the further data to the third node periodically in between transmitting data of said stream to the second node.

50. The first node of claim 30, wherein the rate control is transmitter-based such that said feedback from the third node comprises at least one or more statistics of the route between the first and third node, and the processing apparatus of the first node is configured to determine the rate of transmission to the second node based on said one or more statistics.

51. The first node of claim 50, wherein said one or more statistics comprise at least one of a loss rate and a queuing delay.

52. The first node of claim 30, wherein the rate control is receiver based, such that said feedback from the third node comprises an indication of the specified rate or bandwidth of the route between the first and third node, and the processing apparatus of the first node is configured to use the specified rate or bandwidth as the rate of transmission to the second node.

53. A first node for controlling a rate of transmission from the first node to a second, recipient node;
the first node comprising:
a transmitter arranged to transmit a stream from the first node to the second node over a first network route, wherein the transmitter is configured to transmit further data from the first node to a third node over a second network route substantially overlapping with the first network route, the further data being different from data of the stream;
a receiver arranged to receive feedback at the first node from the third node regarding transmission of the further data to the third node over the second network route; and
processing apparatus configured to control, based on said feedback from the third node, a rate of transmission of the stream to the second node over the first network route;
wherein the second node has no rate control mechanism compatible with that of the first node.

54. The first node of claim 53, wherein the processing apparatus is configured to determine whether the second node has a rate control mechanism compatible with the first node, and selecting to use said third node for feedback on condition of said detection.

55. The first node of claim 54, wherein the processing apparatus is configured to perform said determination by transmitting data from the first node to the second node and detecting whether a rate control feedback message is returned from the second node to the first node within a timeout period.

56. The first node of claim 54, wherein the processing apparatus is configured to perform said determination by transmitting a query message from the first node to the second node, and receiving back a response message from the second node to the first node indicating whether the second node has a compatible rate control mechanism.

57. A first node for controlling a rate of transmission from the first node to a second, recipient node;
the first node comprising:
a transmitter arranged to transmit a stream from the first node to the second node over a first network route, wherein the transmitter is configured to transmit further data from the first node to a third node over a second network route substantially overlapping with the first network route, the further data being different from data of the stream;
a receiver arranged to receive feedback at the first node from the third node regarding transmission of the further data to the third node over the second network route; and
processing apparatus configured to control, based on said feedback from the third node, a rate of transmission of the stream to the second node over the first network route;
wherein the transmitter is arranged such that said further data transmitted to the third node comprises an indication of an amount of data sent in said stream to the second node, and said feedback received by the first node's receiver from the third node is based on the indication of said amount.

* * * * *